(12) United States Patent
Yamamuro

(10) Patent No.: US 7,825,187 B2
(45) Date of Patent: Nov. 2, 2010

(54) WATER RESISTANT MOLDING MATERIAL AND PRODUCING METHOD FOR THE SAME

(75) Inventor: Toshiyuki Yamamuro, Yokohama (JP)

(73) Assignee: Infua Co., Ltd., Yokohama-shi, Kanagawa (JP)

( * ) Notice: Subject to any disclaimer, the term of this patent is extended or adjusted under 35 U.S.C. 154(b) by 318 days.

(21) Appl. No.: 11/826,490

(22) Filed: Jul. 16, 2007

(65) Prior Publication Data

US 2008/0293873 A1    Nov. 27, 2008

(30) Foreign Application Priority Data

May 23, 2007   (JP)   ............................. 2007-136270

(51) Int. Cl.
*C08F 2/16*   (2006.01)
*C08L 29/04*   (2006.01)

(52) U.S. Cl. ...................... 524/803; 524/800

(58) Field of Classification Search ................. 524/800, 524/803
See application file for complete search history.

(56) References Cited

U.S. PATENT DOCUMENTS

| 5,506,280 A | * | 4/1996 | Miller et al. | ................. 523/218 |
| 6,444,728 B1 | * | 9/2002 | Yuyama | ...................... 523/218 |

FOREIGN PATENT DOCUMENTS

| CA | 2 073 490 | 1/1993 |
| JP | 2001-131329 | 5/2001 |
| JP | 2001-234081 | 8/2001 |
| KR | 10-2006-0093902 | 8/2006 |

* cited by examiner

*Primary Examiner*—Vasu Jagannathan
*Assistant Examiner*—Karuna P Reddy
(74) *Attorney, Agent, or Firm*—Manabu Kanesaka

(57) ABSTRACT

The invention provides a water resistant molding material that can be stably manufactured while being excellent in water resistance after dried, and a producing method for the water resistant molding material. The water resistant molding material comprises a binder resin containing a polyvinyl alcohol resin, a viscosity control agent, water and a filler, wherein the concentration of acetate ions is adjusted in the range from 500 to 12,000 ppm by blending, for example, an acetate ion controlling agent (such as $NH_4NO_3$, NaOH and KCl).

9 Claims, 4 Drawing Sheets

WATER RESISTANT MOLDING MATERIAL AND PRODUCING METHOD FOR THE SAME

BACKGROUND OF THE INVENTION

1. Field of the Invention

The invention relates to a water resistant molding material (sometimes called as modeling material), and a producing method for the water resistant molding material. In particular, the invention relates to a water resistant molding material that can be stably manufactured while being excellent in water resistance after dried, and a producing method for the water resistant molding material.

2. Description of the Related Art

Light weight molding materials (which may be referred to as light clays hereinafter) that are ready for molding and transport have been widely used in recent years as clays used for handcrafts. Such light clays can be obtained by blending hollow microspheres as fillers with a polyvinyl alcohol resin, a fiber powder and water in a predetermined proportion.

However, when organic hollow microspheres or inorganic hollow microspheres are added to the polyvinyl alcohol resin, the latter is flocculated while viscosity, fluidity and cohesivity, etc. of the light clay decrease within a short period of time.

Accordingly, a light clay, that is not cracked, broken or fractured even by being severely deformed by an external force after molding and drying while long term storage is possible, has been proposed for solving above-mentioned problems (see, for example Japanese Patent Application Laid-Open (JP-A) No. 2001-131329; claims and examples).

More specifically, the light clay is composed of synthetic resin hollow microspheres (from 5 to 15% by weight) with a particle diameter of 20 to 120 μm as principal materials, a polyvinyl alcohol resin (from 5 to 10% by weight), a vinyl acetate resin and water (from 50 to 80% by weight). A bending ratio between the polyvinyl alcohol resin and the vinyl acetate resin is in the range from 10:7 to 10:3 by weight.

Another proposed light clay is also quite excellent in deformation resistance when dried with excellent properties such as workability and soft touch feeling as clays used for handcrafts (see, for example, JP-A-2001-234081; claims and examples).

More specifically, this light clay for handcrafts is composed of synthetic resin hollow microspheres (from 5 to 15% by weight) with a particle diameter of 20 to 120 μm, a polyvinyl alcohol resin (from 5 to 10% by weight), a vinyl acetate resin (from 1.5 to 7% by weight) containing a plasticizer, polyethylene oxide (from 0.5 to 1.5% by weight) and water (from 50 to 80% by weight).

However, no attention has been paid on the concentration of acetate ions in the light clays disclosed in JP-A-2001-131329 and JP-A-2001-234081, and the manufacturing characteristics have been unstable, while the clay obtained is poor in water resistance.

Since the vinyl acetate resin containing the plasticizer is an essential component of the light clay disclosed in JP-A-2001-131329, the polyvinyl alcohol resin is flocculated when stored for a long period of time under hermetically sealed conditions, and viscosity and plasticity of the light clay are remarkably deteriorated.

The content of a binder resin (such as a polyvinyl alcohol resin, vinyl acetate resin containing a plasticized, or polyethylene oxide) is too large in the light clays disclosed in JP-A-2001-131329 and JP-A-2001-234081 while the blending ratio between the binder resin and water is not optimized. For this reason, the molding material obtained has been poor in fluidity as well as in shape-keeping ability.

SUMMARY OF THE INVENTION

Accordingly, the inventors of the invention have found, through intensive studies, that for example, an acetate ion controlling agent is added or a process of adjusting acetate ions during heat treatment is executed to control the concentration of acetate ions in a molding material within a predetermined range, so as to enable the improvement of the balance between fluidity and water resistance after dried when producing and using the molding material, thereby completing the invention.

An object of the present invention is to provide a water resistant molding material that not only can attain appropriate fluidity when the molding material is manufactured and used, but also exhibits excellent water resistance after dried, and a producing method for the water resistant molding material efficiently.

According to an aspect of the invention, there is provided a water resistant molding material containing a binder resin including a polyvinyl alcohol resin, water and a filler (a light weight material), wherein the concentration of acetate ions in the water resistant molding material is adjusted in the range from 500 to 12,000 ppm, whereby the aforementioned problem can be solved.

More specifically, it is possible to provide a molding material that exhibits excellent water resistance after dried by for example, adding an acetate ion controlling agent and by adjusting heat treatment conditions to control the concentration of the acetate ions within a predetermined range.

Also, a water resistant molding material having uniform characteristics as well as excellent long-term storage stability can be stably produced by controlling the concentration of the acetate ions in the water resistant molding material within a predetermined range.

The concentration (ppm) of the acetate ions in the molding material refers to the amount of acetate ions (mg) per 1 kg of the water resistant molding material.

The concentration of the acetate ions in the molding material is conjectured to be changed because, when combining a binder resin containing a polyvinyl alcohol resin with organic hollow microspheres or inorganic hollow microspheres, or with inorganic fillers, acetate groups in the polyvinyl alcohol resin are hydrolyzed, and release the acetate ions to be converted into hydroxyl groups.

It is possible to readily control the concentration of the acetate ions within a predetermined range, for example, by adding an acetate ion controlling agent (such as $NH_4NO_3$, NaOH and KCl) or by adjusting the heat treatment conditions.

A predetermined amount of the acetate ions is released and remains in the molding material as a result of slowly advancing hydrolysis, although the material does not substantially contain the acetate ion at the initial stage. The concentration of the acetate ions may be precisely controlled by measuring the amount of the ions with an ion-chromatographic apparatus.

Preferably, the content of water in the water resistant molding material of the invention is adjusted in the range from 32 to 89% by weight relative to the total amount of the material.

Restricting the content of water within the above-mentioned range enables to keep a good balance among soft touch feeling, drying property and water resistance of the water resistant molding material by.

Preferably, the amount of the polyvinyl alcohol resin to be added in the water resistant molding material of the invention is adjusted in the range from 0.5 to 22% by weight relative to the total amount of the material.

Restricting the content of water within the above-mentioned range makes it possible to keep a better balance among soft touch, drying property and water resistance of the water resistant molding material.

Preferably, the amount of the filler to be added in the water resistant molding material of the invention is restricted in the range from 3 to 55% by weight.

It is also possible to keep a better balance between soft touch feeling (convenience of use) and light weight of the water resistant molding material by restricting the content of the filler within the above-mentioned range.

Preferably, the blending ratio (weight ratio) of water/polyvinyl alcohol resin in the water resistant molding material of the invention is adjusted in the range from 3 to 400.

The blending ratio of water to the polyvinyl alcohol resin is restricted within the above-mentioned range, which enables to keep a better balance among soft touch, drying property and water resistance of the water resistant molding material.

Preferably, the water resistant molding material of the invention further contains a viscosity control agent while the amount of the viscosity control agent to be added is adjusted in the range from 0.1 to 20% by weight relative to the total amount of the material.

Adjusting the amount of the viscosity control agent resin to be added within the above-mentioned range enables to keep a better balance between soft touch feeling, drying property and water resistance of the water resistant molding material.

Preferably, the water resistant molding material of the invention contains at least one cation selected from the group consisting of sodium ion, potassium ion and ammonium ion while the total content of the cation is adjusted in the range from 500 to 16,000 ppm relative to the total amount of the material.

Controlling the total amount of the cation within the above-mentioned range allows hydrolysis to be properly advanced, which facilitates control of the concentration of acetate ions in the water resistant molding material within a predetermined range.

Accordingly, the concentration of the cation within the above-mentioned range gives not only an appropriate fluidity when producing and using the molding material, but also excellent water resistance after drying the molding material.

The total amount of the cation in the water resistant molding material may be readily controlled within the predetermined range by adding an acetate ion controlling agent (such as $NH_4NO_3$, NaOH and KCl).

According to another aspect of the invention, there is provided a producing method for a water resistant molding material containing a binder resin including a polyvinyl alcohol resin, water and a filler, the method including the steps of: uniformly mixing the binder resin, water and a filler to obtain a water resistant molding material; and adjusting the acetate ion concentration in the obtained water resistant molding material in the range form 500 to 12,000 ppm.

The concentration of acetate ions in the water resistant molding material is controlled within a predetermined range, for example, by adding an acetate ion controlling agent and by adjusting heat treatment conditions. This makes it possible to efficiently obtain a molding material that attains proper fluidity when manufactured and used and also has excellent water resistance after dried.

DESCRIPTION OF THE PREFERRED EMBODIMENTS

Figure 1:
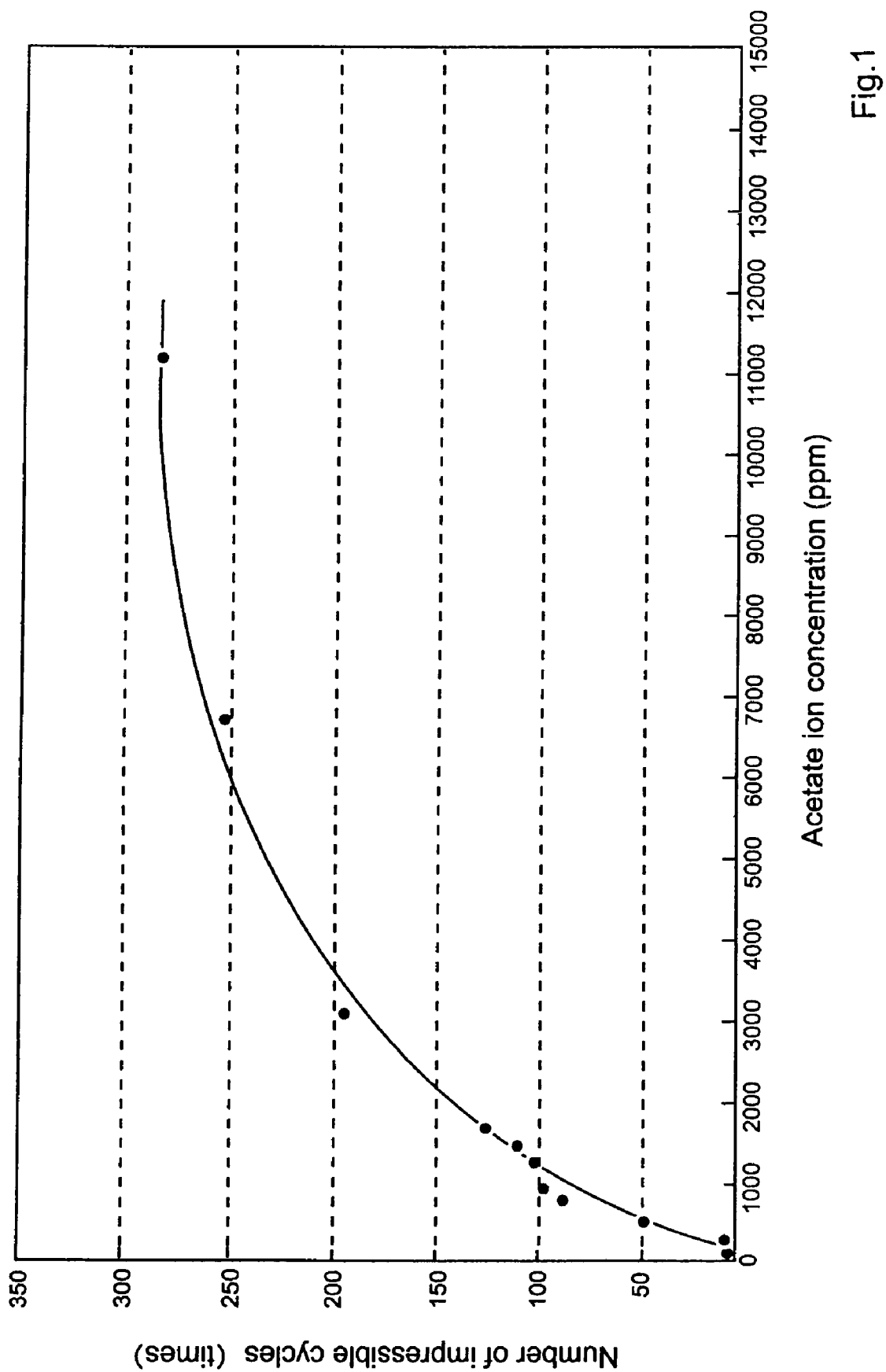
FIG. 1 is a graph for explaining the relation between the acetate ion concentration and water resistance (number of impressible cycles)

An embodiment of the invention provides a water resistant molding material containing a binder resin including a polyvinyl alcohol resin, water and a filler, wherein the concentration of acetate ions in the water resistant molding material is adjusted in the range from 500 to 12,000 ppm.

Another embodiment of the invention provides a producing method for a water resistant molding material containing a binder resin including a polyvinyl alcohol resin, water and a filler, the method including the steps of: uniformly mixing the binder resin, water and a filler to obtain a water resistant molding material; and adjusting the acetate ion concentration in the obtained water resistant molding material in the range form 500 to 12,000 ppm.

The water resistant molding material and the producing method for the water resistant molding material of the invention will be described hereinafter for respective constituent elements of the invention.

1. Binder Resin (1) Kind

A polyvinyl alcohol resin is used as the binder resin. This is because the polyvinyl alcohol resin contains many hydroxyl groups per unit weight to render the resin to have proper viscosity, fluidity and cohesivity etc., and accordingly, the water resistant molding material is able to exhibit preferable characteristics with a small amount of the resin added.

Further, the polyvinyl alcohol resin is excellent in water holding ability while it is excellent in compatibility with other water-soluble resins, for example hydroxyl group-containing compounds and carboxyl group-containing compounds.

Examples of the polyvinyl alcohol resin include polyvinyl alcohol itself obtained by oxidation of vinyl acetate; modified polyvinyl alcohol prepared by inserting carboxyl groups into side chains of polyvinyl alcohol; modified polyvinyl alcohol prepared by inserting amino groups into the side chains of polyvinyl alcohol; and modified polyvinyl alcohol prepared by inserting long chain alkyl groups having 10 or more carbon atoms into the side chains of polyvinyl alcohol.

When the water resistant molding material is formulated into a cream or soft touch feeling of the material is desired to be improved, polyacrylic acid is preferably used together with the polyvinyl alcohol resin.

More specifically, polyacrylic acid facilitates the entire molding material to be creamy by adding a small amount of polyacrylic acid so as to obtain a water resistant molding material excellent in soft touch feeling. For this reason, polyacrylic acid is useful for concomitant use with the polyvinyl alcohol resin.

While a vinyl acetate resin or polyethylene oxide may be added to the binder resin, fluidity may be remarkably deteriorated or soft touch feeling of the molding material may be impaired by adding these chemicals. Accordingly, the content of the vinyl acetate resin or polyethylene oxide is preferably adjusted to be less than 0.5% by weight relative to the total amount of the molding material.

(2) Content

The content of the binder resin is preferably in the range from 0.2 to 30% by weight relative to the total amount (100% by weight) of the water resistant molding material.

The reason is that handling and moldability of the water resistant molding material may be remarkably impaired when the content of the binder resin is less than 0.2% by weight, while on the other hand, malleability of the water resistant molding material may be remarkably decreased and dispersion of the material by mixing becomes difficult when the content of the binder resin exceeds 30% by weight.

Therefore, the content of the binder resin is preferably in the range from 0.3 to 25% by weight, more preferably from 0.4 to 22% by weight, relative to the total amount of the molding material in order to keep a good balance between handling and moldability of the water resistant molding material and malleability of the water resistant molding material.

The content of the polyvinyl alcohol resin as a part or all of the binder resin is preferably in the range from 0.5 to 22% by weight relative to the total amount (100% by weight) of the water resistant molding material.

This is because adjusting the content of the polyvinyl alcohol resin within the above-mentioned range enables not only to obtain excellent soft touch feeling and molding ability of the water resistant molding material but also to effectively suppress the polyvinyl alcohol resin from being flocculated even after long term storage.

Accordingly, the content of the polyvinyl alcohol resin as the binder resin is adjusted to be preferably in the range from 0.6 to 20% by weight, more preferably in the range from 0.7 to 18% by weight, relative to the total amount of the water resistant molding material.

The flocculation of the polyvinyl alcohol resin by acetate ions will be described in detail in the section of ions hereinafter.

2. Water

The content of water is preferably determined in consideration of handling and moldability of the water resistant molding material or readiness of manufacture of the water resistant molding material. For example, the content of water is preferably in the range from 30 to 89% by weight relative to the total amount of the molding material.

This is because control of viscosity may be difficult and fluidity may be remarkably decreased when the content of water is less than 30% by weight, while on the other hand, control of creep resistance may be difficult to cause shape-keeping ability to be remarkably deteriorated when the content of water exceeds 89% by weight.

Accordingly, the content of water is preferably in the range from 50 to 85% by weight, more preferably in the range from 60 to 80% by weight, relative to the total amount of the water resistant molding material.

The content of water is preferably determined by taking the content of the polyvinyl alcohol resin into consideration. In other words, the ratio of blending (weight ratio) of water to the polyvinyl alcohol resin is preferably in the range from 3 to 400.

This is because control of viscosity becomes difficult and fluidity may be remarkably decreased when the blending ratio of water to the polyvinyl alcohol resin is less than 3, while on the other and, control of creep resistance is difficult to cause shape-keeping ability to be remarkably deteriorated when the blending ratio of water to the polyvinyl alcohol resin exceeds 400.

For this reason, the blending ratio (weight ratio) of water to the polyvinyl alcohol resin is preferably in the range from 5 to 300.

3. Filler (1) Kind

While the kind of the filler including aggregate etc. is not particularly restricted, examples of the filler include one or a combination of at lease two of talc, silica, calcium carbonate, titanium oxide, clay, kaolinite, illite, montmorillonite, bentonite, fly ash, mica, diatomaceous earth, pearlite, gypsum and feldspar.

Organic hollow microspheres are preferably used as the filler since lightweight of the molding material may be readily achieved by using the organic hollow microspheres.

The favorably used organic hollow microspheres may be any microspheres having an outer shell (a shell wall) made of an organic material with a hollow space therein. More specifically, the outer shell is preferably composed of, for example, a vinylidene chloride-acrylonitrile copolymer resin, vinyl acetate-acrylonitrile copolymer resin, methyl methacrylate-acrylonitrile copolymer resin or acrylonitrile resin, and has a gas or liquid incorporated therein.

The organic hollow microspheres having an outer shell composed of, for example, the vinyl acetate-acrylonitrile copolymer resin, methyl methacrylate-acrylonitrile copolymer resin or acrylonitrile resin are preferable since they have high whiteness.

Inorganic hollow microspheres such as volcanic ash microballoons may be also preferably used as one kind of the filler. The inorganic hollow microspheres have high heat resistance while it is lightweight. Accordingly, using the inorganic hollow microspheres allows the weight of the water resistant molding material per unit volume to be remarkably reduced.

Breakage may be effectively prevented and dispersibility of the inorganic hollow microspheres may be improved by using the inorganic hollow microspheres and organic hollow microspheres in combination, since the inorganic hollow microspheres distributed around the organic hollow microspheres serve as cushion materials.

Using the inorganic hollow microspheres and organic hollow microspheres in combination in the water resistant molding material also permits coloring ability to be enhanced when a colorant is used, shape-keeping ability of the water resistant molding material to be enhanced, or shrinkage ratio to be decreased.

(2) Average Particle Diameter

While the preferable particle diameter of the filler changes depending on the kind of the filler, it is usually in the range from 0.1 to 120 µm.

This is because the molding ability of the water resistant molding ability may be decreased and lightweight of the molding material may be hardly achieved by adding a predetermined amount of the filler when the average particle diameter of the filler is less than 0.1 µm, while on the other hand, dispersion by mixing the filler may become difficult and the molding ability of the water resistant molding material may be impaired when the average particle diameter of the filler exceeds 120 µm.

Accordingly, the average particle diameter of the filler is preferably in the range from 1 to 100 µm, more preferably in the range from 10 to 80 µm.

An image of the filler may be obtained by an optical microscope to calculate the average particle diameter of the filler from the image by using an image processing apparatus.

(3) Content

The content of the filler is preferably in the range from 3 to 55% by weight relative to the total amount of the molding material.

The reason is that a balance between lightweight of the water resistant molding material and molding ability and handling of the material may be easily controlled when the content of the filler is within the above-mentioned range.

More specifically, the reason is that lightweight of the water resistant molding material may be hardly achieved and shape-keeping ability of the molding material may be remarkably deteriorated when the content of the filler is less than 3% by weight, while on the other hand, molding ability and handling of the water resistant molding material may be remarkably impaired and dispersion by mixing may become difficult when the content of the filler exceeds 55% by weight.

Accordingly, the content of the filler is preferably in the range from 4.5 to 45% by weight, more preferably in the range from 6 to 40% by weight.

When the filler has a specific gravity of 1 $g/cm^3$ or less as the organic hollow microsphere has, the content of the filler is preferably in the range from 3 to 22% by weight, more preferably in the range from 5 to 10% by weight, relative to the total amount of the molding material.

4. Viscosity Control Agent (1) Kind

While the kind of the viscosity control agent is not particularly restricted, at leas one compound selected from the group consisting of fatty acids, fatty acid slats, sulfonic acid salts, sulfate ester compounds, polysaccharides, nonionic cellulose derivatives, acrylamides, polyacrylic acid and guar gum is preferably used.

More specifically, a preferable example of the viscosity control agent is one or a combination of two or more of lauric acid, myristic acid, palmitic acid, stearic acid, oleic acid, lauryl sulfate ester, methyl cellulose, hydroxypropylmethyl cellulose, hydroxyethylmethyl cellulose, hydroxypropyl cellulose, hydroxydiethyl cellulose, carboxymethyl cellulose, propene amide, guar gum and hydroxypropyl guar gum.

This is because these viscosity control agents are able to be compatible with the polyvinyl alcohol resin to form a uniform mixture so as to easily control the viscosity of the water resistant molding material within a predetermined range, and the viscosity control agents are also able to effectively prevent flocculation of the polyvinyl alcohol resin so as to prevent the viscosity of the entire water resistant molding material as well as the content of water from being changed. Accordingly, the initial state of viscosity, fluidity and aggregation ability etc. may be effectively maintained even when surrounding environmental conditions have been changed.

(2) Content

The content of the viscosity control agent is preferably adjusted in the range from 0.1 to 20% by weight relative to the total amount of the molding material.

This is because the viscosity may be increased and flocculation of the polyvinyl alcohol resin may be hardly prevented when the content of the viscosity control agent is less than 0.1% by weight, while on the other hand, shape-keeping ability of the water resistant molding material may be remarkably changed and dispersion by mixing may become difficult when the content of the viscosity control agent exceeds 20% by weight.

Accordingly, the content of the viscosity control agent is preferably in the range from 0.3 to 18% by weight, more preferably in the range from 0.5 to 16% by weight, relative to the total amount of the molding material in order to keep good valance between flocculation prevention and shape-keeping ability of the water resistant molding material.

5. Ion (1) Acetate Ion

The concentration of acetate ions is adjusted in the range from 500 to 12,000 ppm relative to the total amount of the water resistant molding material.

The reason is that excellent productivity as well as excellent long term storability may be attained by controlling the acetate ion concentration within the above-mentioned range, and that the acetate ion concentration in this range permits a water resistant molding material that exhibits excellent water resistance after dried to be provided.

Accordingly, the concentration of acetate ions is more preferably in the range from 700 to 11,000 ppm, further preferably from 900 to 10,000 ppm, relative to the total amount of the water resistant molding material.

The total amount of the acetate ions and predetermined cations which will be described later may be measured with an ion-chromatographic apparatus. Details of the measuring conditions and the like will be described in Examples hereinafter.

The relation between the concentration of acetate ions contained in the water resistant molding material and the water resistant property of the water resistant molding material will be described below with reference to FIG. 1.

FIG. 1 shows a characteristic curve in which the horizontal axis denotes the acetate ion concentration (0 to 14,000 ppm) relative to the total amount of the water resistant molding material and the vertical axis denotes the number of impressible cycles (times) as an index of water resistant characteristics of the water resistant molding material. The water resistant molding material used is in accordance to Examples 1 to 6 and Comparative Examples 1 and 2.

As may be comprehended from the characteristic curve, the number of impressive cycles remarkably increases as the acetate ion concentration increases.

Figure 2A:
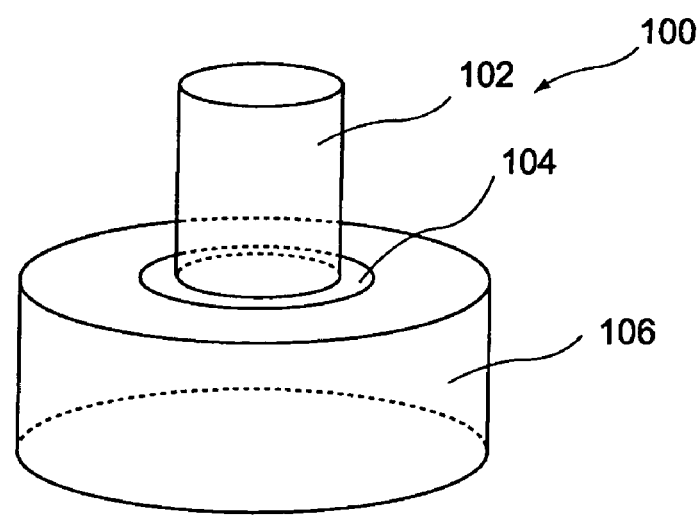
FIGS. 2A to 2C are views for explaining stamps.

More specifically, a stamp 100 as shown in FIG. 2A is molded when the concentration of acetate ions contained in the water resistant molding material is less than 500 ppm. It can be said that the molding material is poor in water resistance with the number of impressive cycles of less than 50 when the molded stamp 100 is subjected to the water resistance test. In fact, it has been observed that a part of the surface of the molded stamp of the water resistant molding material is dissolved with a water-soluble ink.

Figure 2B:
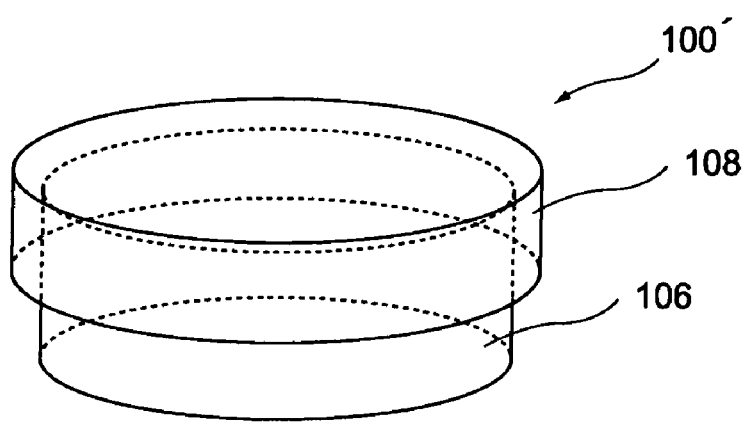
Figure 2C:
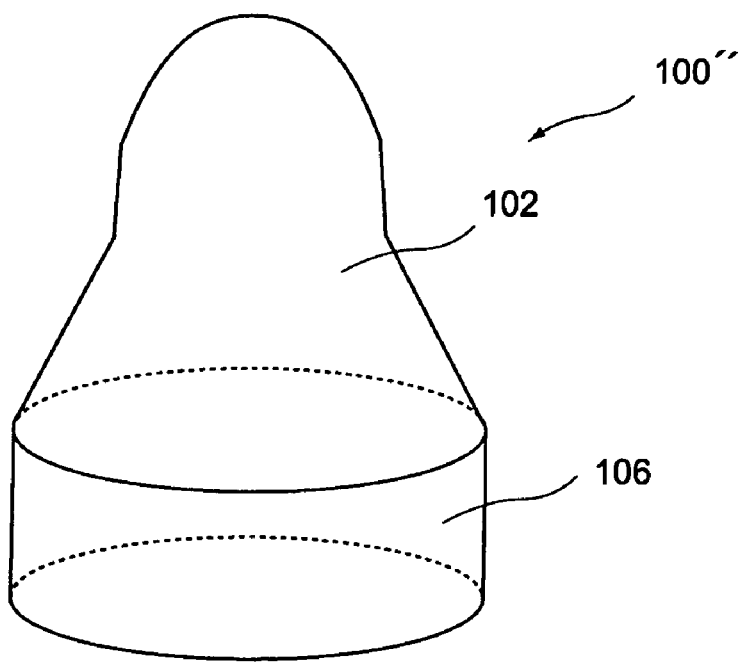

However, the water resistant molding material shows uniform fluidity characteristics in the producing method (process), and it has been confirmed that stamps as shown in FIGS. 2A to 2C are stably manufactured (molded).

The stamp 100 shown in FIG. 2A is manufactured in such a manner that a cylindrical body 106 with a diameter of 25 mm and a thickness of 8 mm is molded from a water resistant molding material and a cylindrical handle 102 with a diameter of 8 mm and a length of 15 mm made of a polyethylene foam material is attached using an adhesive 104.

A stamp 100' shown in FIG. 2B is manufactured in such a manner that a cylindrical body 106 with a diameter of 25 mm and a thickness of 20 mm is molded from a water resistant molding material, and a cylindrical cap 108 with a diameter of 28 mm and a depth of 12 mm made of a polyethylene foam material is attached so that a part of the cylindrical body is housed in the cap.

A stamp 100" shown in FIG. 2C is manufactured in such a manner that a cylindrical body 106 with a diameter of 25 mm and a thickness of 8 mm is molded from a water resistant molding material, and an approximately conical handle 110 made of the same water resistant molding material is attached on the surface of the cylinder.

It has been confirmed that when the concentration of acetate ions contained in the water resistant molding material is in the range form 500 to 1,000 ppm, incidence of dissolving phenomenon is considerably decreased on the surface of the stamp with the number of impressible cycles in the range from 50 to 90.

The water resistant molding material shows uniform fluidity characteristics in the producing method, and it has been confirmed that the stamps as shown in FIGS. 2A to 2C can be stably manufactured.

It has been confirmed that when the concentration of acetate ions contained in the water resistant molding material exceeds about 1,200 ppm, the number of impressible cycles exceeds 100, and incidence of dissolution phenomenon on the surface of the stamp can be substantially reduced.

The water resistant molding material shows almost uniform fluidity characteristics in the producing method, and it has been confirmed that the stamps as shown in FIGS. 2A to 2C can be stably manufactured.

It has been also shown that, when the concentration of acetate ions contained in the water resistant molding material exceeds about 3,000 ppm, the number of impressible cycles is about 200 and substantially no dissolution phenomenon occurs on the surface of the stamp.

On the other hand, a part of the water resistant molding material shows uneven fluidity characteristics in the producing method, and it has been confirmed that stable manufacture of the stamp as shown in FIGS. 2A to 2C is partly difficult.

It has been confirmed that when the concentration of acetate ions contained in the water resistant molding material is in the range from about 6,000 ppm to 12,000 ppm, the number of impressible cycles exceeds 250 and substantially no uneven dissolution phenomenon occurs on the surface of the stamp.

On the other hand, the water resistant molding material shows substantially uneven fluidity characteristics in the producing method when the acetate ion concentration exceeds 12,000 ppm, which reveals that stable manufacture of the stamps as shown in FIGS. 2A to 2C is difficult.

Accordingly, it may be concluded that the acetate ion is a main cause of deterioration of the water resistant molding material while excellent productivity as well as excellent water resistant characteristics of the water resistant molding material can be manifested after dried, when the acetate ion concentration is adjusted in a predetermined range (from 500 to 12,000 ppm).

(2) Cation (2)-1: Kind

The water resistant molding material of the invention preferably contains at least one cation selected from the group consisting of sodium ion, potassium ion and ammonium ion.

This is because the ions contained in the molding material interact with the polyvinyl alcohol resin as a resin component contained in the water resistant molding material to accelerate hydrolysis of the resin, with the result in effective improvement of water resistance.

Accordingly, decrease of mechanical strength or the like due to moisture absorption may be effectively suppressed even after long term storage of the water resistant molding material when the water resistant molding material contains such ions.

(2)-2: Total Amount

The total amount of at least one of sodium ion, potassium ion and ammonium ion is preferably adjusted in the range from 500 to 16,000 ppm relative to the total amount of the molding material.

This is because the cations contained in the molding material within the above-described range interact with the polyvinyl alcohol resin contained in the water resistant molding material to accelerate hydrolysis of the resin, with the result in effective improvement of water resistance.

Accordingly, in consideration of improvement of water resistance and storage stability of the water resistant molding material, the total amount of at least one of sodium ion, potassium ion and ammonium ion is adjusted more preferably in the range from 600 to 14,000 ppm, further preferably in the range from 700 to 12,000 ppm, and most preferably in the range from 1,000 to 8,000 ppm relative to the total amount of the molding material.

The total amount of the cations in the water resistant molding material may be easily adjusted in a predetermined range by adding the acetate ion controlling agent (such as $NH_4NO_3$, NaOH and KCl).

6. Additives (1) Fiber

The water resistant molding material preferably contains fibers (pulps).

The reason is that molding ability and shape-keeping ability may be improved while the molding material may be endowed with an effect for preventing shrinkage when the molding material contains fibers (pulps).

On the other hand, fluidity of the water resistant molding material may be remarkably decreased with the fibers (pulps) as additives.

Accordingly, the amount of the fibers (pulps) to be added is preferably 6% by weight or less relative to the total amount of the molding material.

(2) Colorant

A colorant is preferably added for coloring the water resistant molding material. While the kind of the colorant is not particularly restricted, it may be any colorants usually used in the fields of inks and dyes, and examples thereof include organic pigments, inorganic pigments and dyes.

The content of the colorant is preferably in the range form 0.01 to 10% by weight relative to the total amount of the molding material.

This is because coloring ability of the colorant may be decreased without exhibiting the effect of addition and synergic effect with the filler when the content of the colorant is less than 0.01% by weight, while on the other hand, coloring ability may be decreased due to increased intensity of light scattering and excessive coagulation of the colorant when the content of the colorant exceeds 10% by weight.

Accordingly, the content of the colorant is adjusted more preferably in the range from 0.02 to 8% by weight, further preferably in the range from 0.03 to 7% by weight, in order to improve coloring ability by the colorant.

(3) Other Additives

One or a combination of two or more of a fungicide, an antibacterial agent, an antioxidant, a UV absorbing agent, oils, waxes, a viscosity improving agent, a plasticizer, a surfactant other than viscosity controlling agents and organic solvents may be preferably added as additives other than the above-mentioned additives in the water resistant molding material.

7. Producing Method (1) Mixing Step

In this step, the binder resin, filler, viscosity control agent, colorant, water and predetermined cations, etc. are uniformly mixed. For example, a propeller mixer, kneader, planetary mixer, three-screw roll or ball mill may be used for uniform dispersion by mixing these blend materials.

The filler is lightweight and readily broken during kneading while dispersion tends to be uneven. For this reason, it is preferable to apply extrusion kneading using, for example, a kneader at a rotation speed from 10 to 1,000 rpm for 1 to 60 minutes, more preferably at a rotation speed from 30 to 300 rpm for 10 to 30 minutes.

Preferably, the colorant is dispersed in water or alcohol in advance to prepare a dispersion liquid for enabling uniform mixing and dispersion, and the pH of the solution is adjusted to 7 or more by adding an alkaline chemical thereto in order to avoid the solution from being filled.

The temperature of the blend material is preferably maintained, for example, in the range from 30 to 70° C. when the material is mixed.

The reason is that the blend material cannot be uniformly mixed when the mixing temperature is less than 30° C., while elongation of the water resistant molding material is impaired to make the molding material brittle when the mixing temperature exceeds 70° C.

Accordingly, the mixing temperature of the blend material is maintained more preferably in the range from 35 to 60° C., further preferably in the range from 40 to 55° C.

(2) Acetate Ion Adjusting Step

The acetate ions contained in the water resistant molding material are quantified with an ion-chromatographic apparatus which will be described in Example 1 below, to confirm that the concentration is within a predetermined range.

When the concentration of acetate ions contained in the water resistant molding material obtained is out of the predetermined range, the concentration is controlled within the predetermined range, for example, by adding the acetate ion controlling agent (such as $NH_4NO_3$, NaOH and KCl) or by adjusting heat treatment conditions.

Executing the acetate ion adjusting step allows excellent productivity as well as excellent long term storage stability to be attained in the water resistant molding material.

Such an acetate ion concentration permits the water resistant molding material that exhibits excellent water resistance after dried to be efficiently obtained.

(3) Penetration Index Adjusting Step

In this step, the penetration index of the water resistant molding material obtained is adjusted. Preferably, water or the viscosity control agent is added to adjust the penetration index of the water resistant molding material measured according to JISK2207 in the range from 5 to 50 mm (25° C.), for example.

This is because elongation of the water resistant molding material obtained is lost to deteriorate handling ability when the penetration index of the water resistant molding material is less than 5 mm, while on the other hand, the surface becomes stickier to deteriorate handling ability when the penetration index of the water resistant molding material exceeds 50 mm.

EXAMPLES

The invention will be described in detail hereinafter with reference to Examples and Comparative examples.

Example 1

1. Preparation of Water Resistant Molding Material

The following blend materials A to F were added in a kneader equipped with a stirrer and stirred for 30 minutes to prepare a water resistant molding material.

The pH of the water resistant molding material obtained was 6.55.

| | |
|---|---|
| A: polyvinyl alcohol resin | 16 kg |
| (viscosity of 4% aqueous solution: 4,000 mPa · s at 20° C.) | |
| B: organic hollow microsphere | 10 kg |
| (average particle diameter: 35 μm, pH = 7.0) | |
| C: pulp | 1 kg |
| D: butyl paraoxybenzoate | 4.5 kg |
| E: water | 98.9 kg |
| F: $NH_4NO_3$ | 0.3 kg |
| (Total) | (130.7 kg) |

2. Measurement of Ions with Ion-Chromatographic Apparatus (1) Measurement of Acetate Ions The concentration of acetate ions in the obtained water resistant molding material was measured. 0.20 g of the obtained water resistant molding material and 20 ml of ion-exchange water were charged in a plastic container, and then hermetically sealed.

The plastic container was shaken with a shaker at 25° C. for 30 minutes to obtain a suspension solution of the water resistant molding material.

Then, the obtained suspension solution was filtered through a filter, and the obtained filtrate was used for anion assay using the following ion-chromatographic apparatus. The result showed that the acetate ion concentration was 540 ppm.

Figure 3:
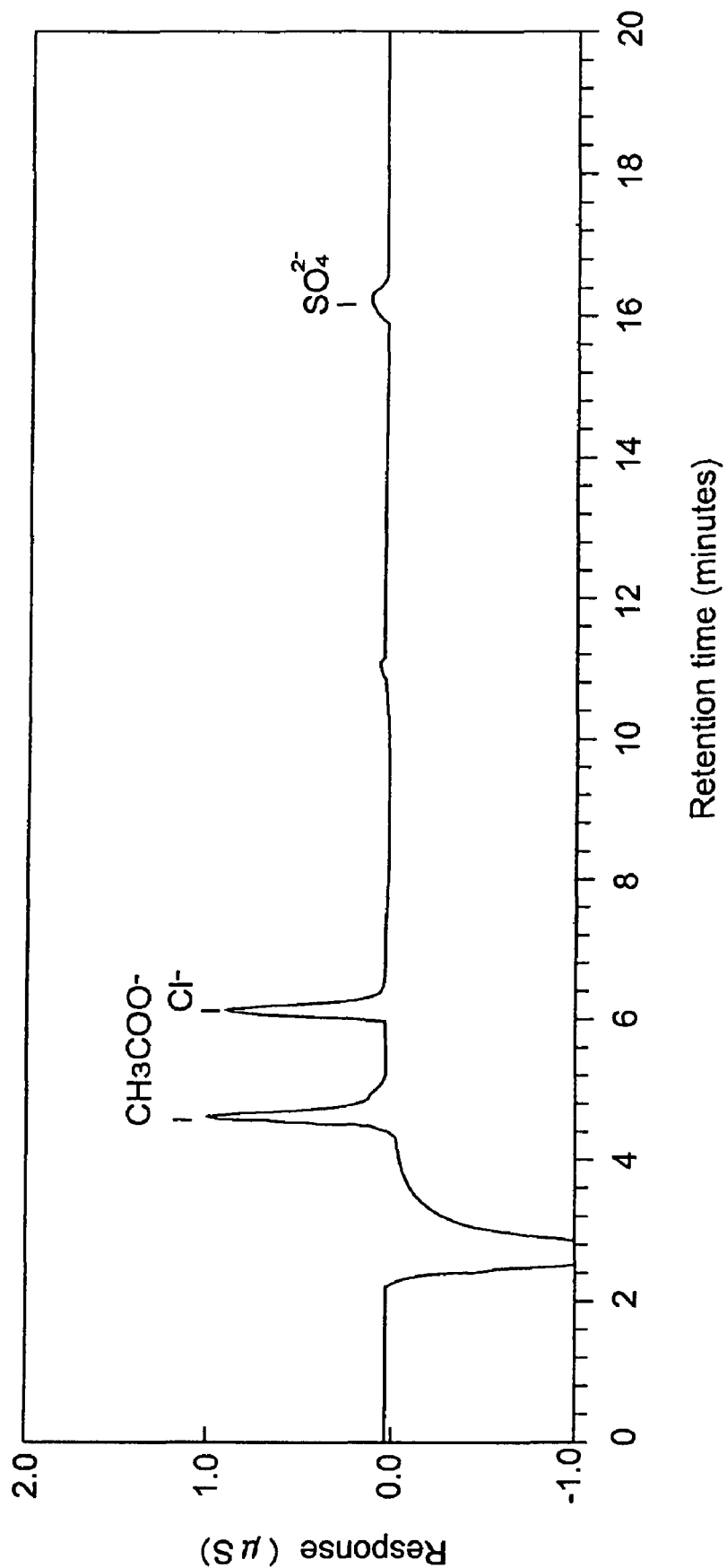
FIG. 3 is a chromatogram of the acetate ion obtained by an ion-chromatographic apparatus.

The results are shown in Table 1. The conditions for measuring the acetate ion were as follows. FIG. 3 shows the chromatogram obtained by a representative ion-chromatographic apparatus.

Apparatus used: Ion chromatograph DX-500, manufactured by DIONEX Corporation

Column used: IC-Pac A25S, manufactured by TOSOH Corporation

Column temperature: 30° C.

Detector: Electric conductance detector

Elution solution: aqueous $Na_2CO_3$ solution (4 mmol/L)

Flow rate: 1.0 mL/min (2) Measurement of Cation

The contents of sodium ions, potassium ions and ammonium ions contained in the obtained water resistant molding material were measured using the ion-chromatographic apparatus under the following conditions.

Apparatus used: Ion chromatograph DX-100, manufactured by DIONEX Corporation

Column used: IonPac CS12A, manufactured by TOSOH Corporation

Column temperature: 22° C.

Detector: electric conduction detector

Elution solution: aqueous methanesulfonic acid solution (0.1 mmol/L)

Flow rate: 0.8 mL/min

3. Water Resistance Test

The stamp as shown in FIG. 2A (with a given stamp image) was formed from the obtained water resistant molding material, and was dried at room temperature for 1 week to be used as a test sample.

An aqueous dye stamp ink (blue: manufactured by Shachihata Inc.) impregnated in a stamp pad was prepared as a stamp ink, and the test stamp was pressed onto the pad for 3 seconds.

Subsequently, the test stamp with the ink adhered thereon was pressed onto a copy paper sheet (A4 size) to transfer the ink onto the paper sheet.

A series of the operation as 1 cycle was repeated, and the number of cycles before the stamp image was blurred was counted.

4. Penetration Index

Figure 4A:
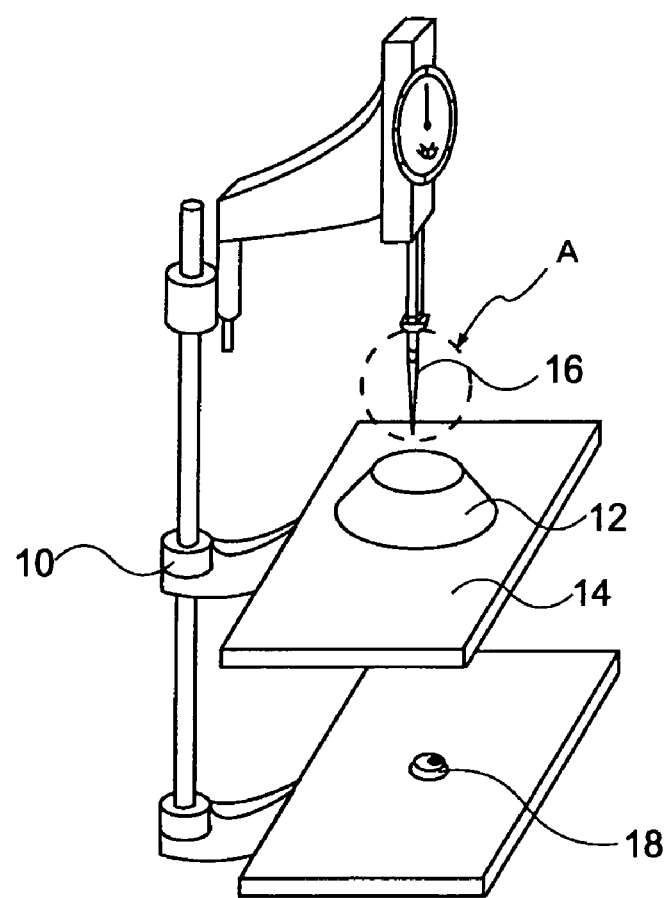
FIGS. 4A and 4B are views for explaining a method for measuring the penetration index.
Figure 4B:
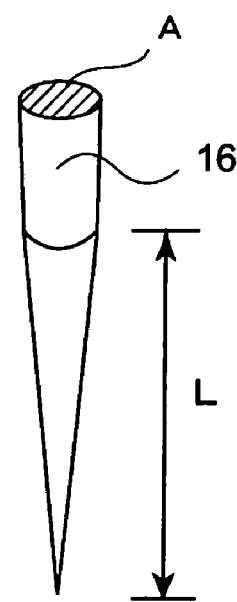

The penetration index of the obtained water resistant molding material was measured according to JIS2207. The penetration index (penetration of 50 g stylus) of the obtained water resistant molding material was measured at 25° C. using a penetration index measuring apparatus 10 as shown in FIG. 4. More specifically, a 50 g load was applied on the stylus, and the length of the stylus penetrating into the molding material in 30 seconds was measured in mm unit. The results obtained are shown in Table 1.

5. Handling Ability

The stamp (with a given stamp image) as shown in FIG. 2A was manufactured, and handling ability of the water resistant molding material was evaluated by the following criteria.

Very good: No stickiness to the hand with easy elongation

Good: Scarcely sticky to the hand and is rather ready for elongation

Fair: Slightly sticky to the hand with little elongation

Bad: Sticky to the hand with almost no elongation

Examples 2 to 6

In Examples 2 to 6, $NH_4NO_3$, NaOH and KCl as acetate ion controlling agents were blended by changing the amounts of addition, respectively. As shown in Table 1, prepared were water resistant molding materials with acetate ion concentrations in the range from 890 to 11,860 ppm as measured with the ion-chromatographic apparatus. The molding materials were evaluated as in Example 1.

Comparative Example 1

In Comparative Example, 1, prepared was a water resistant molding material with an acetate ion concentration of 150 ppm as measured with the ion-chromatographic apparatus.

The water resistant molding material was prepared in the same manner as in Example 1, except that no acetate ion controlling agents (such as $NH_4NO_3$, NaOH and KCl) were added. The ion concentration or the like was measured and handling ability was also evaluated. The results obtained are shown in Table 1.

Comparative Example 2

In Comparative Example 2, prepared was a water resistant molding material with an acetate ion concentration of 290 ppm as measured with the ion-chromatographic apparatus.

The water resistant molding material was prepared in the same manner as in Example 1, except that the molding material was heated at 40° C. for 24 hours without adding acetate ion controlling agents (such as $NH_4NO_3$, NaOH and KCl). The ion concentration or the like was measured and handling ability was also evaluated. The results obtained are shown in Table 1.

Comparative Example 3

In Comparative Example 3, prepared was a water resistant molding material with an acetate ion concentration of 16,600 ppm as measured with the ion-chromatographic apparatus.

The water resistant molding material was prepared in the same manner as in Example 1, except that 3.6 kg of $NH_4NO_3$, 2 kg of NaOH and 1.9 kg of KCl were added.

However, evaluation as the water resistant molding material was impossible since the water resistant molding material was solidified.

Example 7

In Example 7, prepared was a water resistant molding material with an acetate ion concentration of 1,340 ppm as measured with the ion-chromatographic apparatus.

The water resistant molding material was prepared in the same manner as in Example 1, except that $NH_4NO_3$ was not blended and the molding material was hermetically stored for 110 days in a constant temperature bath at 45° C. to be used for a test sample.

Example 8

In Example 8, prepared was a water resistant molding material with an acetate ion concentration of 1,490 ppm as measured with an ion-chromatographic apparatus.

In Example 8, the following blend materials A to G were charged in a kneader equipped with a stirrer and stirred for 30 minutes to prepare the water resistant molding material. The water resistant molding material was evaluated as in Example 1.

---

A: polyvinyl alcohol resin     6 kg
(viscosity of 4% aqueous solution: 4,000 mPa · s at 20° C.)

-continued

| | |
|---|---|
| B: volcanic ash micro-balloon (average particle diameter: 50 μm) | 75 kg |
| C: pulp | 6 kg |
| D: butyl paraoxybenzoate | 4.5 kg |
| E: water | 242 kg |
| F: talc | 170 kg |
| G: oleic acid | 2 kg |
| (total) | (505.5 kg) |

Example 9

In Example 9, prepared was a water resistant molding material with an acetate ion concentration of 960 ppm as measured with the ion-chromatographic apparatus.

In Example 9, the following blend materials A to E were charged in a kneader equipped with a stirrer and stirred for 30 minutes to prepare the water resistant molding material. The water resistant molding material was evaluated as in Example 1.

| | |
|---|---|
| A: polyvinyl alcohol resin (viscosity of 4% aqueous solution: 4,000 mPa · s at 20° C.) | 10 kg |
| B: talc | 140 kg |
| C: pulp | 17 kg |
| D: butyl paraoxybenzoate | 3 kg |
| E: water | 166 kg |
| (total) | (336 kg) |

TABLE 1

| | Acetate Ion Concentration (ppm) | K+ Concentration (ppm) | Na+ Concentration (ppm) | NH4+ Concentration (ppm) | Water Resistance (Number of Impressive Cycles) | Penetration Index (mm) | Handling Ability |
|---|---|---|---|---|---|---|---|
| Example 1 | 540 | 10 | ND | 510 | 51 | 14 | Fair |
| Example 2 | 890 | 10 | 480 | 500 | 80 | 14 | Good |
| Example 3 | 1740 | 1100 | 480 | 500 | 126 | 13 | Good |
| Example 4 | 3120 | 2180 | 950 | 1000 | 195 | 12 | Very good |
| Example 5 | 6810 | 4350 | 2520 | 2030 | 253 | 12 | Very good |
| Example 6 | 11860 | 6400 | 5000 | 3980 | 288 | 10 | Very good |
| Example 7 | 1340 | 10 | ND | ND | 100 | 13 | Good |
| Exemple 8 | 1490 | 1340 | ND | ND | 115 | 17 | Good |
| Example 9 | 960 | 910 | ND | ND | 92 | 12 | Good |
| Comparative Example 1 | 150 | 10 | ND | ND | 3 | 17 | Bad |
| Comparative Example 2 | 290 | 10 | ND | ND | 9 | 17 | Bad |
| Comparative Example 3 | 16600 | 8410 | 7240 | 5900 | Molding Impossible | Molding Impossible | Bad |

According to the water resistant molding material of the invention, appropriate fluidity for manufacture and use of the molding material can be obtained by, for example, adding the acetate ion controlling agents or adjusting heat treatment conditions so as to control to a predetermined value the concentration of acetate ions contained in the water resistant molding material.

On the other hand, decrease of water resistance after dried may be effectively suppressed by adjusting the concentration of acetate ions contained in the water resistant molding material.

Accordingly, the water resistant molding material of the invention is abundant in fluidity for a long period of time while being quite excellent in water resistance after dried. Therefore, the molding material may be favorably used for composite materials in contact with aqueous materials, such as stamp materials (with stamp images), undercoat materials of mural wall painting, undercoat materials of oil painting, undercoat materials of water color painting, mimic samples of, for example, candies and cakes, and ornament materials.

What is claimed is:

1. A water resistant molding material comprising:
   a binder resin containing a polyvinyl alcohol resin, water, a filler, and an acetate ion content controller; wherein a concentration of acetate ions in the water resistant molding material is adjusted in a range from 700 to 12,000 ppm; and
   at least one kind of cation selected from the group consisting of sodium, potassium, and ammonium ions, wherein a total amount of the cation is adjusted in a range from 500 to 16,000 ppm relative to a total amount of the water resistant molding material.

2. The water resistant molding material according to claim 1, wherein a content of water is adjusted in a range from 30 to 89% by weight relative to a total amount of the water resistant molding material.

3. The water resistant molding material according to claim 1, wherein an amount of the polyvinyl alcohol resin to be added is adjusted in a range from 0.5 to 22% by weight relative to a total amount of the water resistant molding material.

4. The water resistant molding material according to claim 1, wherein an amount of the filler to be added is adjusted in a range from 3 to 55% by weight relative to a total amount of the water resistant molding material.

5. The water resistant molding material according to claim 1, wherein a blend ratio (weight ratio) of water to the polyvinyl alcohol resin is adjusted in a range from 3 to 400.

6. The water resistant molding material according to claim 1, further containing a viscosity control agent, wherein an amount of the viscosity control agent to be added is adjusted in a range from 0.1 to 20% by weight relative to a total amount of the water resistant molding material.

7. A producing method for a water resistant molding material comprising a binder resin containing a polyvinyl alcohol resin, water and a filler, the producing method comprising the steps of:

uniformly mixing the binder resin, water and filler to obtain a water resistant molding material; and adjusting an acetate ion concentration in the obtained water resistant molding material in a range form 700 to 12,000 ppm while adding at least one kind of cation selected from the group consisting of sodium ion, potassium ion, and ammonium ion, wherein a total amount of the cation is adjusted in a range from 500 to 16,000 ppm relative to a total amount of the water resistant molding material.

8. The water resistant molding material according to claim 1, wherein the cations are obtained from NaOH, KCl, and $NH_4NO_3$, which are cation donors, and accelerate hydrolysis of the polyvinyl alcohol resin.

9. The water resistant molding material according to claim 1, further comprising: one or a combination of two or more of a fungicide, an antibacterial agent, an antioxidant, a UV absorbing agent, oils, waxes, a viscosity improving agent, a plasticizer, a surfactant other than viscosity controlling agents and organic solvents.

* * * * *